Patented Dec. 30, 1952

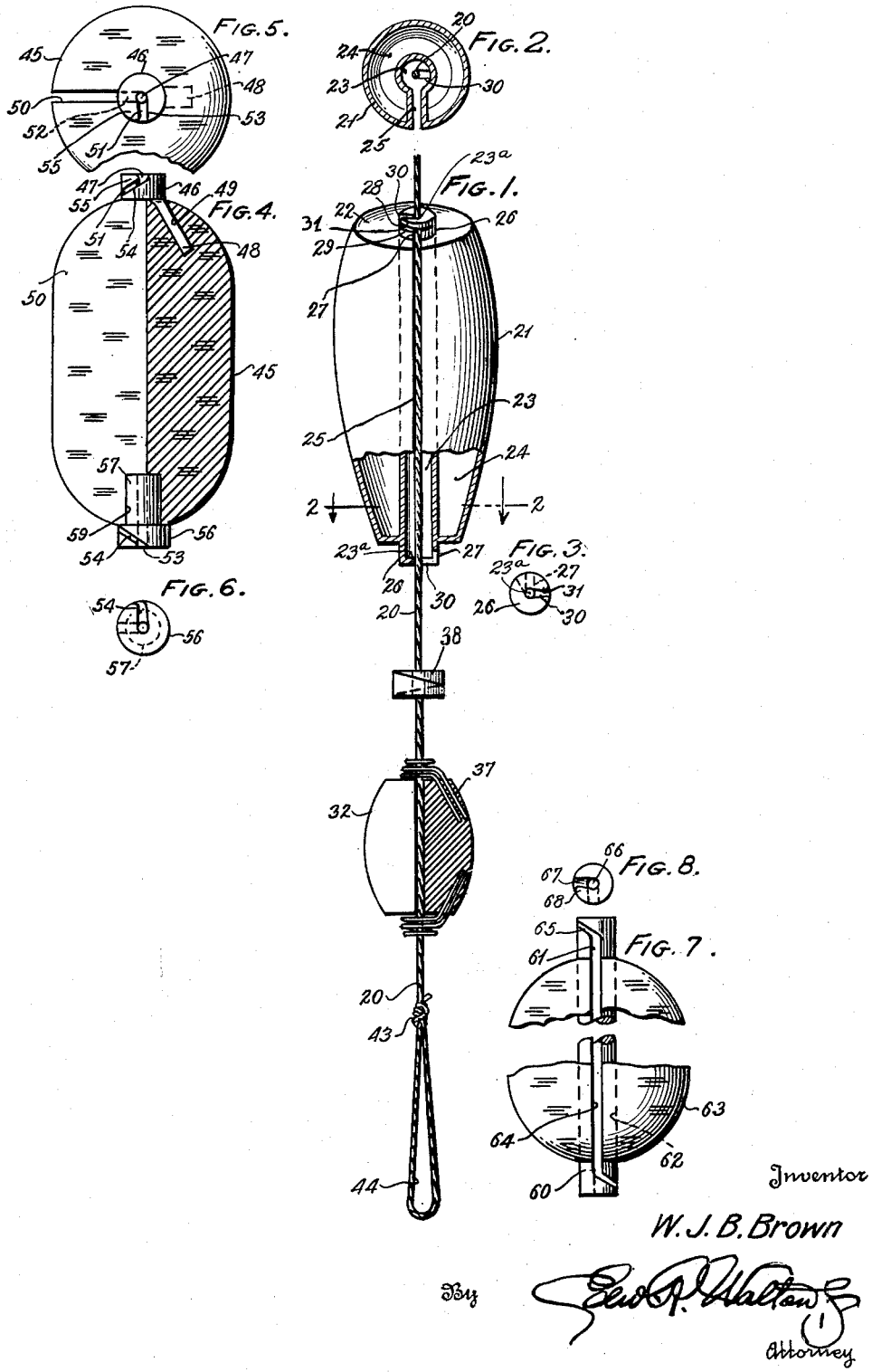

2,623,322

UNITED STATES PATENT OFFICE 2,623,322

FISHING TACKLE

William Jennings Bryan Brown,
Corpus Christi, Tex.

Application December 19, 1947, Serial No. 792,660

3 Claims. (Cl. 43—44.91)

My invention relates to individual fishing tackle and particularly to the combination of float and sinker used with casting rods in so-called "bait fishing," wherein minnows, worms, doughbails, or other edible bait is used.

In the use of terminal tackle of this kind when angling for fish that feed on the bottom, such as catfish, it is usually the practice to use floats and sinkers which slide freely on the line. Several purposes are served by this arrangement. Primarily, the baited hook is maintained on the bottom where the fish are most likely to find it. Then, the line will be free to run through the sinker when a fish commences to work on the bait. The sinker will not be dragged along the bottom to raise a cloud of mud and thereby frighten the fish away. An additional advantage is the ability to cast the baited hook to a greater distance than could be done when the float and sinker are fixed in position on the line. Free-sliding floats and sinkers may be brought close together against a knot tied in the line at the point of attachment of the hook and then the whole terminal combination may be reeled up close to the rod tip for easy casting.

It sometimes happens that, while engaged in "bait fishing" on the bottom, the angler will observe an especially attractive game fish, such as bass, rising to the surface nearby. Prompt action with an artificial lure, such as a plug or spoon, may be required, if it be desired to take advantage of such an opportunity. Too much time would be lost if it were necessary to cut the line to remove the float and sinker before replacing the ordinary hook with an artificial lure, even though the latter operation may be facilitated by use of a swivel-snap which may be quickly engaged with, or disengaged from, the hook or artificial lure. Floats and sinkers that may be attached to a line, or detached therefrom, by lateral movement alone, instead of by the threading method, which necessitates cutting the line, are needed in such situations. The use of laterally detachable floats and sinkers has a further advantage in that it is possible to disassemble rod and line without cutting the line. After a fishing line has become wet by use, it will weaken in strength from light and dry rot if not promptly unthreaded from the rod guides and given proper treatment and storage.

In the past, numerous forms of floats and a few sinkers have been designed to meet the need for lateral line attachment and detachment, but they have possessed objectionable features which it has been my purpose to eliminate in my improved construction.

A feature common to practically all of the laterally manipulated floats is a side slot in the body which extends lengthwise of the central line bore and radially through the outer surface of the body. This permits lateral insertion of the fishing line into the bore, wherein it usually is free to slide lengthwise. Various means for securing the line against accidental detachment during use have been proposed previously. They differ from each other in construction and method of operation and may be grouped in two general classes: the adjustable core or plug type, and the fixed terminal guide type. With one exception of which I am aware, all the floats which have retaining plugs are open to the serious objection that the line is free to contact the edge of the central bore of the float at each end thereof. This happens because it is customary to provide the plug with a lengthwise side slot, which is brought into registration with the side slot of the float body by rotation of the plug to permit lateral insertion of the line. When the plug is then rotated sufficiently to close the body slot and thus confine the line against lateral detachment, the plug slot is closed by the material of which the float body is made. If this be soft cork, which is usual, the line is certain to cut into the float material at the edges of its bore where it opens through the ends of the body. Inevitably a crack, or fissure, will be created with the result that the float is quite certain to stick on the line, instead of sliding freely, due to warping of the line into the crack. In the exceptional instance which I have in mind, it had been necessary to countersink a bearing block in each end of the cork float to protect the edges of the bore against line-cuts.

It has been my purpose to avoid the employment of expensive bearing blocks in floats of the plug type, and I have made this possible by providing the plugs with integral end guides which confine the line in the plug slot and at the same time prevent any contact with the edges of the bore in the float body.

More specifically, I propose to make the plug of material possessing a certain degree of elasticity, such as some of the well known plastics, and to produce the end guide by terminating the side slot short of each plug end and by introducing an offset continuation of the side slot which opens through the plug end at a location angularly displaced radially from the side slot. By making the offset continuation of the side slot narrower than the main portion of the slot, the fishing line will be compressed while being forced into the end portion of the plug bore. Because of the elasticity of the plug material, the offset portion of the slot may be so narrow that slight spreading of the slot will be necessary for introduction of the line. Once the line has reached the end portion of the bore, it will be secure against lateral release except through positive efforts toward that end of the part of the angler.

Referring again to the other class of known floats which employ fixed terminal guides for lateral attachment and detachment of the fishing line, practically all of the guides are made by twisting wire into some form of spiral to provide a yieldable constricted slot, or throat, for introduction of the fishing line into each end of the body bore. These wire guides become deformed and bent and the convolutions thereof become compressed together or distorted—all making it difficult, if not impossible, to pass a line therethrough and frequently injure the fishing line. In most instances, the shank or anchor portion of the guide is set rigidly in a hole drilled or punched into the float body.

A thought underlying the invention of each modification of my line guide has been the possibility that prospective users may desire to procure some preferred type of guide alone and then to fit it to slotted floats or sinkers already in their possession. It should be apparent that, by a little simple drilling, or cutting, or punching, with tools ordinarily found in any home, an old float or sinker can be prepared for attachment to one of my guides.

With these objects in view, my invention consists in whatever is described by, or is included within the terms or scope of the appended claims.

In the drawings:

Figure 1 is a side elevation, partly in section, of a set of terminal tackle (minus hook) assembled on a fishing line and which includes my new sinker, a preferred form of float, and a bumper of the separate type.

Figure 2 is a cross-section on line 2—2 through the float of Figure 1;

Figure 3 is a bottom plan view of the lower guide plug of the float shown in Figure 1;

Figure 4 is an axial section off a float having two different forms of guide applied to the opposite ends thereof;

Figure 5 is a top plan view of the float shown in Figure 4;

Figure 6 is a bottom plan view of the lower guide shown in Figure 4;

Figure 7 is a fragmentary side elevation of a float having a further modified form of guide plug;

Figure 8 is a plan view of the upper end of the guide plug used in the float of Figure 7;

Referring first to the disclosure in Figures 1 to 3 inclusive, the free end portion of the fishing line, designated by the numeral 20, is shown with both elements of the float-sinker combination attached thereto in their usual relative positions and with my shock-absorbing bumper 38 interposed between them on the line. The float 21 and sinker 32 have incorporated in their construction the preferred forms of my proposed lateral attachment and detachment line guides. The line 20 may be provided with a loop 44, by means of a knot 43, for a direct attachment of a fish hook or an intermediate swivel-snap, neither of which is shown.

The float element 21 may be made of any of the buoyant materials usually used for this purpose, such as cork or wood, but I prefer to mold or cast it out of plastic material or metal with an air chamber to afford the required buoyancy. I prefer to form the body 21 of the float so that a cavity 22 is provided in the upper end to make this a "popping" float. The body 21 is provided with a central, axial tubular bore 23 which does not communicate with the air chamber 24 between it and the outer wall of the float. The usual lengthwise side slot 25 intersects bore 23 and opens through the outer side and end surfaces of the body, and likewise does not communicate with the air chamber 24. In prolongation of the walls of each end of the body bore 23 and cast as an integral part of the body 21, I have provided a line guide 26 in the form of a fixed projection having a passage 23$^a$ aligned with the bore 23, as an extension of the latter, and a radial side slot 30 angularly offset from the side slot 25 in the float body 21 and intersecting the passage 23$^a$. The slot 30 extends from the passage 23$^a$ through the end and side walls of the projection 26 and communicates with the side slot 25 by means of a perimetral or circumferential slot part 29 extending to the passage 23$^a$ with an end 27 registering and communicating with the slot 25 in the float and its other end 28 communicating with the slot 30—thus, in effect, forming a zigzag slot. Roughly speaking, the slot part 29 is a segment of a plane at right angles to the passage 23$^a$ with its ends 27 and 28 angularly disposed relative to each other and radially of the passage 23$^a$ and with all portions communicating with the passage 23$^a$. It will be observed that the outer end of the slot part 30 is narrower than its inner end at the passage 23$^a$. This difference is intentional and is for the purpose of compressing the fishing line, when it is drawn into the offset slot portion 30. As a function of the narrowed slot part 30, a relative thin line retaining lip 31 is produced and, should the float be made of plastic or other elastic or resilient material, this lip will be sufficiently yieldable to permit the fishing line to be wedged through the slot 30.

The float may be attached to a fishing line by lateral manipulation of the line through the guide slots 30 into the central bore 23 of the float and passages 23$a$ of the guides 26, without turning, twisting, removal or insertion of any part of the float 21 or its guides 26, whereupon the float will be free to slide on the line. During either attachment or detachment, as the line is wedged through slot portions 30 of the end guides 26, the lips 31 will be flexed so as to permit this operation. However, after the line has been inserted, accidental detachment will be prevented. Positive manipulation of the line through the offset slot part past the retaining lip will be required.

In Figs. 4 to 6 inclusive, a slotted float 45 is shown as being made in solid form from a piece of cork or other buoyant material with a line guide of modified offset slot construction mounted at each end. The slot construction of these two end guides is substantially identical, but the anchoring means differ. Referring first to the line guide shown at the upper end of the float, the head portion 46 of the guide is cylindrical in form and has a central bore or passage 47. The head 46 is secured in alignment with the axis of the float, in this instance, by means of an angularly projecting shank or anchor 48 which may be formed integral with the head 46 and which is adapted to be inserted into a socket 49 drilled or otherwise cut into a float body in the opposite side thereof with respect to the side slot 50. In this modified form of guide, slot 51 intersects the passage 47 throughout its length and includes a radial inner portion 52 which registers with the float slot 50, an outer radial portion 53, which is offset angularly from slot 50, and a connecting spiral portion 54. As in the preferred form of line guide, a lip 55 is formed between the diagonal slot and the outer surface of the guide head.

The line guide shown at the bottom of the float in Fig. 4 is of the plug type illustrated in Fig. 1, the only difference being that the head portion 56 is larger than the anchor portion 57. To accommodate the anchor 57, an enlarged opening or recess 59 is provided in the lower end of the float bore.

In Figs. 7 and 8, I have illustrated a still further modified form of line guide of the plug type. In this instance, the body 60 of the guide is cylindrical in shape throughout so that the anchor portion and the portions which contain the line retaining means are indistinguishable from each other except for the changes in path of the line-slot 61. This form of line guide is made long enough to extend clear through the central bore 62 in float body 63 with its ends projecting slightly above and below the float body. The straight main portion of the slot 61 is intended to be maintained permanently in registration with the side slot 64 of the float. The offset end portions 65 of the guide slot intersect the bore 66 and lead from the straight portion of slot 61 to the radial end portions 67 which are displaced angularly preferably 90° from the main portion of the slot and similar lips 68 are created. The difference between this modification and those disclosed in Figs. 4 to 6 is the one-piece guide construction for the entire float.

Although certain specific embodiments of the invention have been shown and described, it is quite obvious that many modifications thereof are possible. The invention, therefore, is not to be restricted except insofar as is necessitated by the prior art and by the spirit of the appended claims.

What I claim, as new, is:

1. In a fishing line holding device quickly attachable and detachable from a fishing line and of the type having a body member having a central open-ended line-receiving bore therethrough and a lateral side slot intersecting the bore throughout its length and opening through the end and side surfaces of the body, and guide members at each end of said body member communicating with said bore and slot thereof, the improvement being that each of said guide members is a solid member fixedly connected to said body member and projecting therefrom and having a central passage therethrough aligning with the bore in said body member and further having an inclined slot in its side wall, a radial slot in its outer end connecting one end of the inclined slot with said central passage, and another radial slot adapted to communicate the other end of the inclined slot with said lateral slot in the body member, whereby a fishing line may be quickly passed through said slots to and from said bore and central passage and, when in said bore and passage, is retained against accidental detachment.

2. A terminal fishing tackle as set forth in claim 1 wherein the radial slot in the outer end of guide member has an outwardly extending converging wall defining a constriction lip at the outer end portion of said radial slot to restrict the slot to the passage of a fishing line therethrough except by exerted force.

3. In fishing tackle, a guide for attachment to the end of a fishing-line holding device having a body member provided with a central line receiving bore therethrough and a lateral slot intersecting the bore throughout its length and opening through the ends and side surfaces of said body, said guide comprising a solid cylindrical-like head portion having a longitudinal passage therethrough and having a shank projecting therefrom adapted to be attached to an end portion of said body member and to fixedly position said head portion with its passage in alignment with said bore in said body member, said head portion further having a generally circumferentially extending segmental slot opening from the outer surface of said head to said passage therein, a radial slot in the end surface of said head and communicating with one end of said segmental slot and another radial slot in the inner surface of said head and communicating with the other end of said segmental slot and adapted, when said guide is in attached position to said body member, to align and communicate with said lateral slot in said body member.

W. J. B. BROWN.

REFERENCES CITED

The following references are of record in the file of this patent:

UNITED STATES PATENTS

| Number | Name | Date |
|---|---|---|
| 522,167 | Rawlings | June 26, 1894 |
| 571,761 | Gulliford | Nov. 24, 1896 |
| 1,193,912 | Maire et al. | Aug. 8, 1916 |
| 1,830,014 | Brady | Nov. 3, 1931 |
| 1,850,748 | Foster | Mar. 22, 1932 |
| 1,992,293 | Craig | Feb. 26, 1935 |
| 2,106,618 | Mehaffey | Jan. 25, 1938 |
| 2,143,942 | Gruenhagen | Jan. 17, 1939 |
| 2,316,074 | Kimbrough | Apr. 6, 1943 |
| 2,382,677 | Thomas | Aug. 14, 1945 |

FOREIGN PATENTS

| Number | Country | Date |
|---|---|---|
| 464 | Great Britain | of 1899 |